US011410592B1

(12) United States Patent
Chiang et al.

(10) Patent No.: US 11,410,592 B1
(45) Date of Patent: Aug. 9, 2022

(54) DISPLAY METHOD AND DISPLAY DEVICE USING THE SAME

(71) Applicant: NOVATEK MICROELECTRONICS CORP., Hsinchu (TW)

(72) Inventors: Hsin-Tso Chiang, Hsinchu (TW); Tsun-Hou Chou, Zhubei (TW); Po-Hsiang Huang, Zhubei (TW)

(73) Assignee: Novatek Microelectronics Corp, Hsinchu (TW)

( * ) Notice: Subject to any disclaimer, the term of this patent is extended or adjusted under 35 U.S.C. 154(b) by 0 days.

(21) Appl. No.: 17/179,918

(22) Filed: Feb. 19, 2021

(51) Int. Cl.
  *G09G 5/00* (2006.01)
  *G09G 3/20* (2006.01)
  *A63F 13/837* (2014.01)

(52) U.S. Cl.
  CPC .......... *G09G 3/2003* (2013.01); *A63F 13/837* (2014.09); *A63F 2300/8076* (2013.01); *G09G 2340/06* (2013.01)

(58) Field of Classification Search
  CPC ....... G06F 3/04812; G06F 2203/04801; G06F 2203/04804; G09G 3/2003; G09G 2340/06; A63F 13/837; A63F 2300/8076
  USPC ........................................................ 345/156
  See application file for complete search history.

(56) References Cited

U.S. PATENT DOCUMENTS

| 6,486,894 B1* | 11/2002 | Abdelhadi ............... G09G 5/08 345/161 |
| 2010/0045469 A1* | 2/2010 | Reijndorp ............... G06F 3/011 340/573.7 |
| 2014/0207636 A1 | 7/2014 | Malik |
| 2016/0357398 A1* | 12/2016 | Frem ..................... G06F 3/0481 |

FOREIGN PATENT DOCUMENTS

| CN | 101325664 A | 12/2008 |
| CN | 108153809 A | 6/2018 |
| TW | 202029126 A | 8/2020 |

OTHER PUBLICATIONS

Communication from Foreign Patent Office Regarding a Foreign Counterpart Application 110113681.

* cited by examiner

*Primary Examiner* — Jennifer T Nguyen
(74) *Attorney, Agent, or Firm* — Rosenberg, Klein & Lee (57) ABSTRACT

A display method and a display device using the same is disclosed. In the display method, an image is received. The image has an indicative object and a display background that surrounds the indicative object. Then, the original color of the indicative object is changed into a first color and the image that has the indicative object with the first color is displayed based on the average hue of a part of the display background. The part of the display background surrounds the indicative object. The average hue corresponds to a second color. The first color and the second color are complementary colors.

12 Claims, 5 Drawing Sheets

DISPLAY METHOD AND DISPLAY DEVICE USING THE SAME

BACKGROUND OF THE INVENTION

Field of the Invention

The invention relates to the display technology, particularly to a display method and a display device using the same.

Description of the Related Art

With the rapid advancement of computing devices and network environments, online-based games have been increasingly spreading and developing. Online-based games have become more and more popular in that many unspecified or anonymous players at remote places can interact with one another without any spatial constraints and enjoy the games. Among these, shooting games in which players may shoot at targets in a virtual 3D space displayed on a monitor have been particularly popular due to a variety of visual and sound effects and the effect of stress reduction resulting from hitting a target.

The shooting games include a third-person shooter (TPS), in which a character manipulated by a player is displayed on a screen and where the player can manipulate his/her own character while viewing the backside of the character, and a first-person shooter (FPS), in which a player's field of vision becomes a character's field of vision, and where the player makes an attack on a target from the player's point of view. In the field of games where a player controls the shooting action by correctly aiming and firing at a remote distance using a weapon such as a gun under a hypothetical war situation, the first-person shooter, which allows the player to enjoy the game with a sense of presence or immersion as if the player appears to exist in a virtual world, has been widely used.

However, in the case of these shooting games, there are problems in that a clumsy or novice junior player has more difficulty in hitting a target with a bullet than a senior player and accordingly experiences an insufficient sense of immersion and pleasure in the game. These problems are a factor that hinders a new player's participation in or persistent use of the game. In particular, recently, online battle games allowing a large number of players to participate in the games make it more difficult for junior players to adapt themselves in the games.

Therefore, there is a need to increase the convenience of shooting games depending on the skill levels of players so that experienced senior players can still achieve a sense of more tension and liveness while junior players are able to adapt themselves to the shooting games with more ease and interest. In order to increase the convenience of shooting games, the shooting game or the additional function of a display screen can provide an option representing a crosshair to choose from. Compared with the crosshair provided by the shooting game, the crosshair provided by the display screen is more helpful to the user. This is because the aiming accuracy of the crosshair provided by the display screen does not be affected by the recoil effect of the shooting game. In the past, these crosshairs had only one color. The crosshairs sometimes become blurred to affect the user's performance in the game when the game shows on the display screen a background whose color is similar to the color of the crosshair.

SUMMARY OF THE INVENTION

The invention provides a display method and a display device using the same, which enhance the visual effect of an indicative object without affecting the raw image.

In an embodiment of the invention, a display method is provided. In the display method, an image is received. The image has an indicative object and a display background that surrounds the indicative object. Then, the original color of the indicative object is changed into a first color based on the average hue of a part of the display background and the image that has the indicative object with the first color is displayed. The part of the display background surrounds the indicative object. The average hue corresponds to a second color. The first color and the second color are complementary colors.

In an embodiment of the invention, a display device is provided. The display device includes an image processor and a display panel. The image processor is configured to receive an image, wherein the image has an indicative object and a display background that surrounds the indicative object. The image processor is configured to change the original color of the indicative object into a first color based on the average hue of a part of the display background, wherein the part of the display background surrounds the indicative object, the average hue corresponds to a second color, and the first color and the second color are complementary colors. The display panel is coupled to the image processor and configured to display the image that has the indicative object with the first color.

To sum up, the image processor changes the original color of the indicative object into the complementary color of the average hue of a part of the display background, thereby enhancing the visual effect of the indicative object without affecting the raw image.

Below, the embodiments are described in detail in cooperation with the drawings to make easily understood the technical contents, characteristics and accomplishments of the invention.

DETAILED DESCRIPTION OF THE INVENTION

Reference will now be made in detail to embodiments illustrated in the accompanying drawings. Wherever possible, the same reference numbers are used in the drawings and the description to refer to the same or like parts. In the drawings, the shape and thickness may be exaggerated for clarity and convenience. This description will be directed in particular to elements forming part of, or cooperating more directly with, methods and apparatus in accordance with the present disclosure. It is to be understood that elements not specifically shown or described may take various forms well known to those skilled in the art. Many alternatives and modifications will be apparent to those skilled in the art, once informed by the present disclosure.

Unless otherwise specified, some conditional sentences or words, such as "can", "could", "might", or "may", usually attempt to express that the embodiment in the invention has, but it can also be interpreted as a feature, element, or step that may not be needed. In other embodiments, these features, elements, or steps may not be required.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The phrases "be coupled to," "couples to," and "coupling to" are intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The invention is particularly described with the following examples which are only for instance. Those skilled in the art will readily observe that numerous modifications and alterations of the device and method may be made while retaining the teachings of the invention. Accordingly, the following disclosure should be construed as limited only by the metes and bounds of the appended claims. In the whole patent application and the claims, except for clearly described content, the meaning of the article "a" and "the" includes the meaning of "one or at least one" of the element or component. Moreover, in the whole patent application and the claims, except that the plurality can be excluded obviously according to the context, the singular articles also contain the description for the plurality of elements or components. In the entire specification and claims, unless the contents clearly specify the meaning of some terms, the meaning of the article "wherein" includes the meaning of the articles "wherein" and "whereon". The meanings of every term used in the present claims and specification refer to a usual meaning known to one skilled in the art unless the meaning is additionally annotated. Some terms used to describe the invention will be discussed to guide practitioners about the invention. Every example in the present specification cannot limit the claimed scope of the invention.

The terms "substantially," "around," "about" and "approximately" can refer to within 20% of a given value or range, and preferably within 10%. Besides, the quantities provided herein can be approximate ones and can be described with the aforementioned terms if are without being specified. When a quantity, density, or other parameters includes a specified range, preferable range or listed ideal values, their values can be viewed as any number within the given range. For example, if it is described that the length of a component is X cm to Y cm, then it is equivalent to sentence "the length of the component is H, and H can be any real number values between the values of X and Y."

In the following description, a display method and a display device using the same will be provided. The display method changes the original color of an indicative object into the complementary color of the average hue of a part of a display background, thereby enhancing the visual effect of the indicative object without affecting the raw image.

Figure 1:
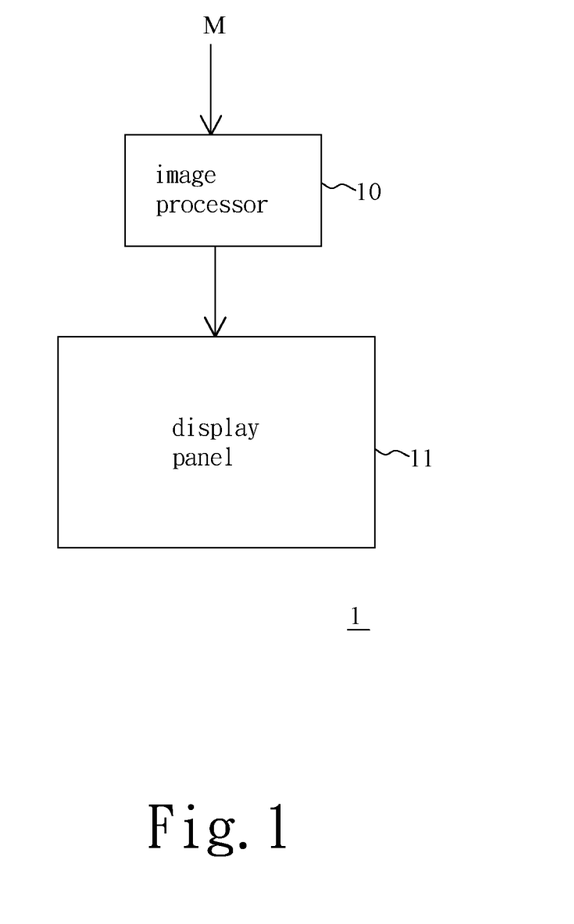
FIG. 1 is a diagram schematically illustrating a display device according to an embodiment of the invention.
Figure 2:
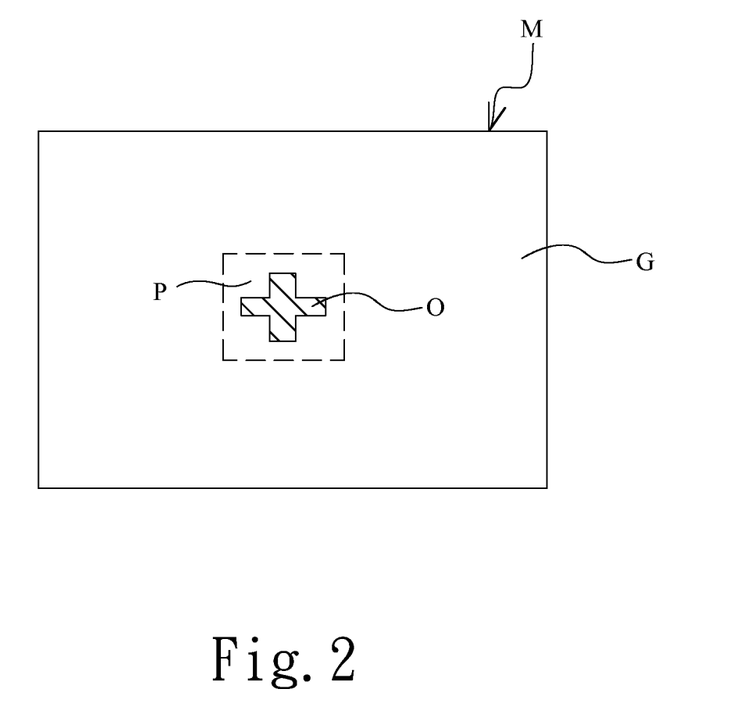
FIG. 2 is a diagram schematically illustrating an image according to an embodiment of the invention.
Figure 3:
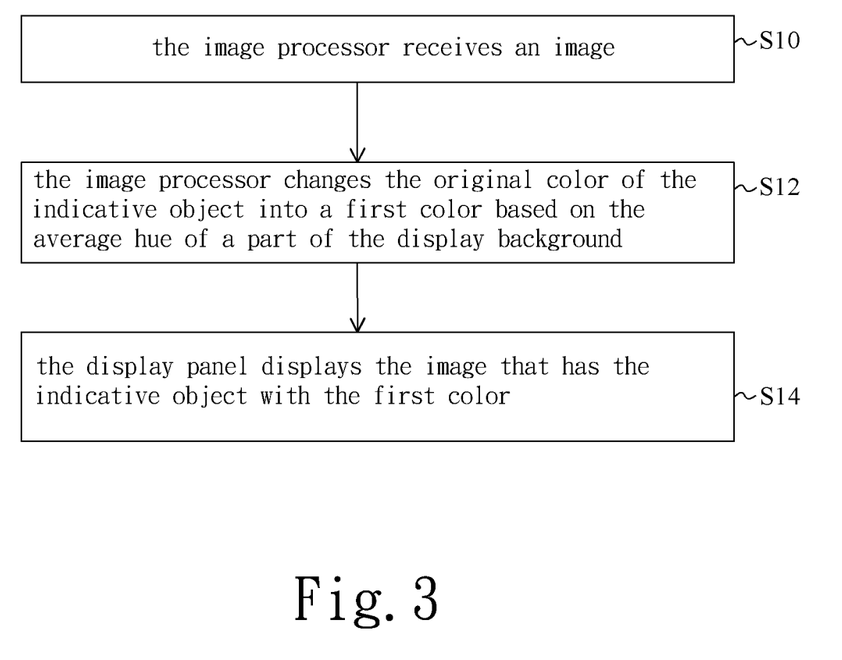
FIG. 3 is a flowchart of a display method according to an embodiment of the invention.

FIG. 1 is a diagram schematically illustrating a display device according to an embodiment of the invention. FIG. 2 is a diagram schematically illustrating an image according to an embodiment of the invention. FIG. 3 is a flowchart of a display method according to an embodiment of the invention. The architecture in FIG. 1 is used in the following embodiments. Referring to FIG. 1, FIG. 2, and FIG. 3, the first embodiment of the invention is introduced as follows. In the first embodiment, a display device 1 includes an image processor 10 and a display panel 11. The image processor 10 is coupled to the display panel 11. In Step S10, the image processor 10 receives an image M. The image M may be a static image or a dynamic image. The image M has an indicative object O and a display background G that surrounds the indicative object O. The indicative object O is generated based on, but not limited to, an on-screen-display (OSD) execution command or a game execution command. The command may be generated in response to an operation of a cursor device or a keyboard coupled to the image processor 10. For example, the command is generated in response to a click operation of the cursor device. The indicative object O may be a cursor, an arrow, a crosshair, a finger pattern, or a penpoint pattern, but the invention is not limited thereto. Besides, the position of the indicative object O is not limited. The indicative object O may be located close to the outer periphery of the image M or fixed at the center of the image M. In Step S12, the image processor 10 changes the original color of the indicative object O into a first color based on the average hue of a part P of the display background G. The part P of the display background G surrounds the indicative object O. The part P is surrounded by a dashed block and arranged outside the indicative object O. In some embodiments of the invention, the outer periphery of the part P of the display background G is substantially closer to the outer periphery of the indicative object O than the outer periphery of the image M. For example, the longest distance between the outer periphery of the part P and the outer periphery of the indicative object O is substantially shorter than the shortest distance between the outer periphery of the part P and the outer periphery of the image M. The average hue of the part P corresponds to a second color. The first color and the second color are complementary colors. For example, the first color and the second color are respectively blue and yellow. In Step S14, the display panel 11 receives and displays the image M that has the indicative object O with the first color, thereby enhancing the visual effect of the indicative object O without affecting the raw image M. In the first embodiment, the display panel 11 displays the image M that has the indicative object O with the first color after the image processor 10 changes the original color of the indicative object O into the first color. However, provided that substantially the same result is achieved, the steps of the flowchart shown in FIG. 3 need not be in the exact order shown and need not be contiguous, that is, other steps can be intermediate. After the image processor 10 changes the original color of the indicative object O into the first color, the image processor 10 may further change the appearance of the indicative object O without affecting the raw image M, such as changing the size of the indicative object O based on a size adjusting command or sharpening the indicative object O based on a sharpening command. The commands may be game execution commands or OSD execution commands, but the invention is not limited thereto. The command may be generated in response to an operation of a cursor device or a keyboard coupled to the image processor 10. For example, the command is generated in response to a click operation of the cursor device.

Figure 4:
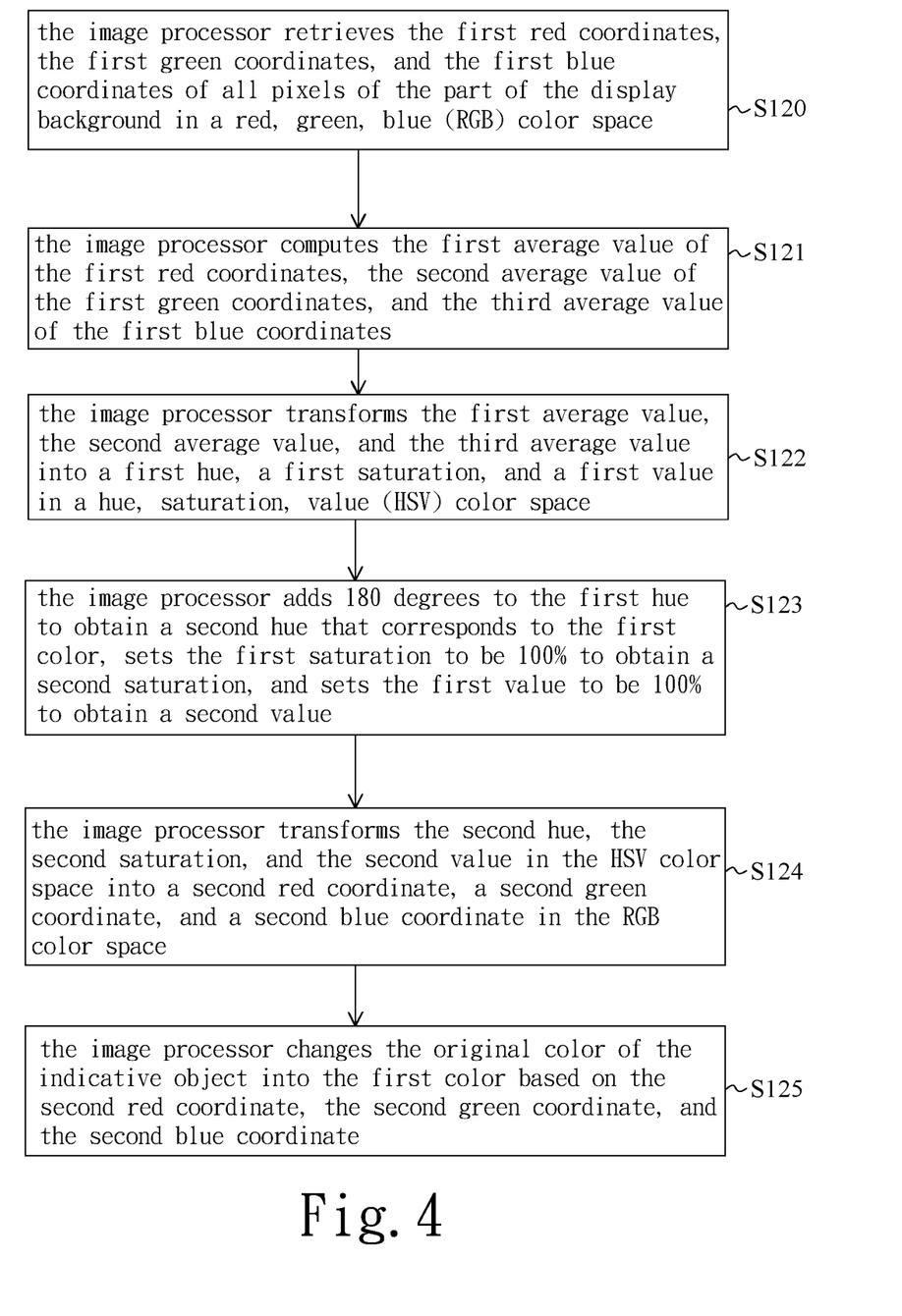
FIG. 4 is a flowchart of changing the original color of the indicative object into the first color according to an embodiment of the invention.

FIG. 4 is a flowchart of changing the original color of the indicative object into the first color according to an embodiment of the invention. Referring to FIG. 1, FIG. 2, FIG. 3, and FIG. 4, Step S12 includes Steps S120, S121, S122, S123, S124, and S125 in some embodiments of the invention. In Step S120, the image processor 10 retrieves the first red coordinates, the first green coordinates, and the first blue coordinates of all pixels of the part P of the display background G in a red, green, blue (RGB) color space. In Step S121, the image processor 10 computes the first average value of the first red coordinates, the second average value of the first green coordinates, and the third average value of the first blue coordinates. In Step S122, the image processor 10 transforms the first average value, the second average value, and the third average value into a first hue, a first saturation, and a first value in a hue, saturation, value (HSV) color space. The first hue is used as the average hue of the part P of the display background G In Step S123, the image processor 10 adds 180 degrees to the first hue to obtain a second hue that corresponds to the first color, sets the first saturation to be 100% to obtain a second saturation, and sets the first value to be 100% to obtain a second value. In Step S124, the image processor 10 transforms the second hue, the second saturation, and the second value in the HSV color space into a second red coordinate, a second green coordinate, and a second blue coordinate in the RGB color space. In Step S125, the image processor 10 changes the original color of the indicative object O into the first color based on the second red coordinate, the second green coordinate, and the second blue coordinate. Provided that substantially the same result is achieved, the steps of the flowchart shown in FIG. 4 need not be in the exact order shown and need not be contiguous, that is, other steps can be intermediate.

In a color space, hue, saturation, and value are alternative representations of the RGB color model. Hue (H) is the basic attribute of color, which is the name of color, such as red, yellow, etc. Saturation (S) represents the purity of color. When the saturation is higher, the color is purer. When the saturation is lower, the color will gradually become gray. Saturation has a range of 0-100%. Value (V) represents brightness and also has a range of 0-100%. HSV color space describes the color at a point in a cylindrical coordinate system. The cylindrical coordinate system has a central axis. The bottom, middle, and top of the central axis respectively represent black, white, and gray. The angle around this axis represents hue. For example, the angle starts at the red primary at 0°, passes through the green primary at 120° and the blue primary at 240°, and then wraps back to red at 360°. The distance to the axis represents saturation. The height along this axis represents value or brightness.

Assume that (r, g, b) is the red, green, and blue coordinates of one color, that their values are real numbers between 0 and 1, that max is equal to the largest value of r, g, and b, and that min is equal to the smallest value of r, g, and b. To find the (h, s, v) value in the HSV color space, h∈[0, 360) degrees represents hue and s, v∈[0,1] are respectively saturation and value. max, min, r, g, b, h, s, and v may satisfy formulas (1), (2), and (3) when the RGB color space is transformed into the HSV color space.

$$h = \begin{cases} 0° & \text{if max} = \text{min} \\ 60° \times \frac{g-b}{\text{max}-\text{min}} + 0° & \text{if max} = r \text{ and } g \geq b \\ 60° \times \frac{g-b}{\text{max}-\text{min}} + 360° & \text{if max} = r \text{ and } g < b \\ 60° \times \frac{b-r}{\text{max}-\text{min}} + 120° & \text{if max} = g \\ 60° \times \frac{r-g}{\text{max}-\text{min}} + 240° & \text{if max} = b \end{cases} \quad (1)$$

$$s = \begin{cases} 0 & \text{if max} = 0 \\ \frac{\text{max}-\text{min}}{\text{max}} = 1 - \frac{\text{min}}{\text{max}}, & \text{otherwise} \end{cases} \quad (2)$$

$$v = \text{max} \quad (3)$$

r, g, b, h, s, and v may satisfy formulas (4), (5), (6), (7), (8), and (9) when the HSV color space is transformed into the RGB color space.

$$hi \text{ is the maximum interger} \leq \frac{h}{60} \quad (4)$$

$$f = \frac{h}{60} - hi \quad (5)$$

$$p = v \times (1 - s) \quad (6)$$

$$q = v \times (1 - f \times s) \quad (7)$$

$$t = v \times [1 - (1 - f) \times s] \quad (8)$$

$$(r, g, b) = \begin{cases} (v, t, p) & \text{if } hi = 0 \\ (q, v, p) & \text{if } hi = 1 \\ (p, v, t) & \text{if } hi = 2 \\ (p, q, v) & \text{if } hi = 3 \\ (t, p, v) & \text{if } hi = 4 \\ (v, p, q) & \text{if } hi = 5 \end{cases} \quad (9)$$

Figure 5A:
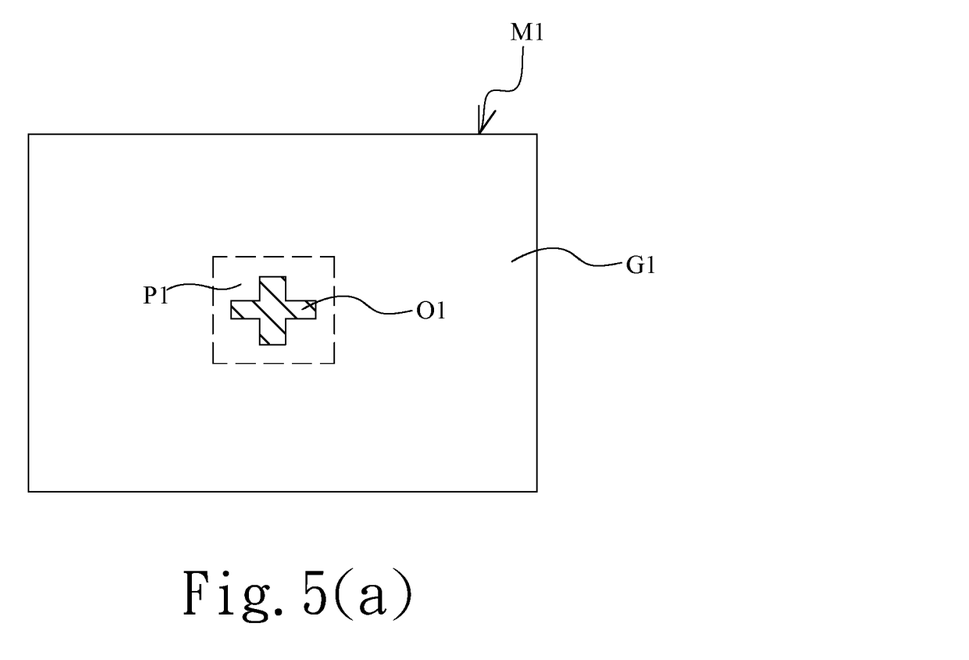
FIG. 5(a) is a diagram schematically illustrating a first image frame according to an embodiment of the invention.
Figure 5B:
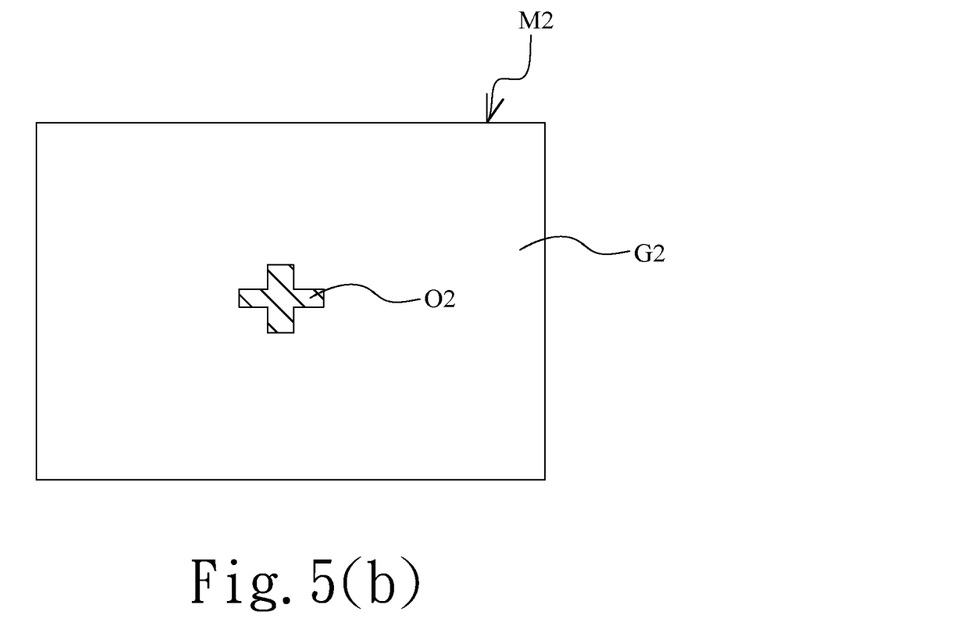
FIG. 5(b) is a diagram schematically illustrating a second image frame according to an embodiment of the invention.

FIG. 5(a) is a diagram schematically illustrating a first image frame according to an embodiment of the invention. FIG. 5(b) is a diagram schematically illustrating a second image frame according to an embodiment of the invention. Referring to FIG. 1, FIG. 2, FIG. 5(a), and FIG. 5(b), a second embodiment of the invention is introduced as follows. The second embodiment is different from the first embodiment in that the image M of the second embodiment includes a first image frame M1 and a second image frame M2 sequentially provided. As a result, the display background G includes a first background G1 and a second background G2 sequentially provided. The indicative object O includes a first display object O1 and a second display object O2 sequentially provided. The first display object O1 and the second display object O2 are the same objects, such as cursors, arrows, crosshairs, finger patterns, or penpoint patterns, but the invention is not limited thereto. The first image frame M1 has the first display object O1 and the first background G1 that surrounds the first display object O1. The second image frame M2 has the second display object O2 and the second background G2 that surrounds the second display object O2. The image processor 10 changes the original color of the second display object O2 of the second image frame M2 into the first color based on the average hue of a part P1 of the first background G1. The part P1 is surrounded by a dashed block and arranged outside the first display object O1. The display panel 11 receives the first image frame M1 and the second image frame M2 and sequentially displays the first image frame M1 and the second image frame M2 that has the second display object O2 with the first color, thereby enhancing the visual effect of the second display object O2 without affecting the first image frame M1 and the second image frame M2. Since a time interval between the first image frame M1 and the second image frame M2 is very short, the time interval can be not perceived by users. For example, the image processor 10 can simultaneously change the original color of the second display object O2 of the second image frame M2 into the first color based on the average hue of the part P1 of the first background G1 and drive the display panel 11 to display the first image frame M1. Afterwards, the image processor 10 can drive the display panel 11 to display the second image frame M2. The part P1 of the first background G1 surrounds the first display object O1. The average hue of the part P1 of the first background G1 corresponds to the second color. In some embodiments of the invention, the outer periphery of the part P1 of the first background G1 is substantially closer to the outer periphery of the first display object O1 than the outer periphery of the first image frame M1. For example, the longest distance between the outer periphery of the part P1 of the first background G1 and the outer periphery of the first display object O1 is substantially shorter than the shortest distance between the outer periphery of the first image frame M1 and the outer periphery of the part P1 of the first background G1.

After the image processor 10 changes the original color of the second display object O2 into the first color, the image processor 10 may further change the appearance of the second display object O2 without affecting the second image frame M2, such as changing the size of the second display object O2 based on a size adjusting command or sharpening the second display object O2 based on a sharpening command. The commands may be game execution commands or OSD execution commands, but the invention is not limited thereto. The command may be generated in response to an operation of a cursor device or a keyboard coupled to the image processor 10. For example, the command is generated in response to a click operation of the cursor device.

Referring to FIG. 1, FIG. 4, FIG. 5(a), and FIG. 5(b), the image processor 10 in the second embodiment also performs the flowchart in FIG. 4 to change the original color of the second display object O2 of the second image frame M2 into the first color. However, the flowchart in FIG. 4 has to be slightly amended in the second embodiment. The amendment of the flowchart in FIG. 4 is introduced as follows. In Step S120, the image processor 10 retrieves the first red coordinates, the first green coordinates, and the first blue coordinates of all pixels of the part P1 of the first background G1 in a red, green, blue color space. In Step S122, the first hue is used as the average hue of the part P1 of the first background G1. In Step S125, the image processor 10 changes the original color of the second display object O2 into the first color based on the second red coordinate, the second green coordinate, and the second blue coordinate. The other features of the flowchart in FIG. 4 have been described previously so will not be reiterated.

According to the embodiments provided above, the display method and the display device change the original color of the indicative object into the complementary color of the average hue of a part of the display background, thereby enhancing the visual effect of the indicative object without affecting the raw image.

The embodiments described above are only to exemplify the invention but not to limit the scope of the invention. Therefore, any equivalent modification or variation according to the shapes, structures, features, or spirit disclosed by the invention is to be also included within the scope of the invention.

What is claimed is:

1. A display method comprising:
   receiving an image, wherein the image has an indicative object and a display background that surrounds the indicative object; and
   changing an original color of the indicative object into a first color based on an average hue of a part of the display background and displaying the image that has the indicative object with the first color, wherein the part of the display background surrounds the indicative object, the average hue corresponds to a second color, and the first color and the second color are complementary colors;
   wherein the step of changing the original color of the indicative object into the first color includes:
      retrieving first red coordinates, first green coordinates, and first blue coordinates of all pixels of the part of the display background in a red, green, blue (RGB) color space;
      computing a first average value of the first red coordinates, a second average value of the first green coordinates, and a third average value of the first blue coordinates;
      transforming the first average value, the second average value, and the third average value into a first hue, a first saturation, and a first value in a hue, saturation, value (HSV) color space, wherein the first hue is used as the average hue of the part of the display background;
      adding 180 degrees to the first hue to obtain a second hue that corresponds to the first color, setting the first saturation to be 100% to obtain a second saturation, and setting the first value to be 100% to obtain a second value;
      transforming the second hue, the second saturation, and the second value in the HSV color space into a second red coordinate, a second green coordinate, and a second blue coordinate in the RGB color space; and
      changing the original color of the indicative object into the first color based on the second red coordinate, the second green coordinate, and the second blue coordinate.

2. The display method according to claim 1, wherein in the step of changing the original color of the indicative object into the first color and displaying the image that has the indicative object with the first color, the image that has the indicative object with the first color is displayed after changing the original color of the indicative object into the first color.

3. The display method according to claim 1, wherein the indicative object is a cursor, an arrow, a crosshair, a finger pattern, or a penpoint pattern.

4. The display method according to claim 1, wherein an outer periphery of the part of the display background is substantially closer to an outer periphery of the indicative object than an outer periphery of the image.

5. The display method according to claim 1, wherein a size of the indicative object is changed based on a size adjusting command after the step of displaying the image that has the indicative object with the first color.

6. The display method according to claim 1, wherein the indicative object is sharpened based on a sharpening command after the step of displaying the image that has the indicative object with the first color.

7. A display device comprising:
an image processor configured to receive an image, wherein the image has an indicative object and a display background that surrounds the indicative object, the image processor is configured to change an original color of the indicative object into a first color based on an average hue of a part of the display background, the part of the display background surrounds the indicative object, the average hue corresponds to a second color, and the first color and the second color are complementary colors; and
a display panel coupled to the image processor and configured to display the image that has the indicative object with the first color;
wherein the image processor is configured to:
retrieve first red coordinates, first green coordinates, and first blue coordinates of all pixels of the part of the display background in a red, green, blue (RGB) color space,
compute a first average value of the first red coordinates, a second average value of the first green coordinates, and a third average value of the first blue coordinates,
transform the first average value, the second average value, and the third average value into a first hue, a first saturation, and a first value in a hue, saturation, value (HSV) color space, wherein the first hue is used as the average hue of the part of the display background,
add 180 degrees to the first hue to obtain a second hue that corresponds to the first color, set the first saturation to be 100% to obtain a second saturation, and set the first value to be 100% to obtain a second value,
transform the second hue, the second saturation, and the second value in the HSV color space into a second red coordinate, a second green coordinate, and a second blue coordinate in the RGB color space, and
change the original color of the indicative object into the first color based on the second red coordinate, the second green coordinate, and the second blue coordinate.

8. The display device according to claim 7, wherein the display panel displays the image that has the indicative object with the first color after the image processor changes the original color of the indicative object into the first color.

9. The display device according to claim 7, wherein the indicative object is a cursor, an arrow, a crosshair, a finger pattern, or a penpoint pattern.

10. The display device according to claim 7, wherein an outer periphery of the part of the display background is substantially closer to an outer periphery of the indicative object than an outer periphery of the image.

11. The display device according to claim 7, wherein the image processor changes a size of the indicative object based on a size adjusting command after the display panel displays the image that has the indicative object with the first color.

12. The display device according to claim 7, wherein the image processor sharpens the indicative object based on a sharpening command after the display panel displays the image that has the indicative object with the first color.

* * * * *